United States Patent [19]

Ward

[11] 4,042,054
[45] Aug. 16, 1977

[54] VEHICLE AND BATTERY PACK

[76] Inventor: Eugene T. Ward, 5791 Wilson Mills Road, Highland Heights, Ohio 44143

[21] Appl. No.: 642,133

[22] Filed: Dec. 18, 1975

[51] Int. Cl.² ............................................. B60L 11/18
[52] U.S. Cl. .................................... 180/60; 180/65 R; 180/68.5
[58] Field of Search ...................... 180/65 R, 60, 68.5, 180/59, 58, 56, 55, 54 F, 11, 12, 1 R

[56] References Cited

U.S. PATENT DOCUMENTS

| 512,327 | 1/1894 | Rogers et al. | 180/11 |
| 1,217,702 | 2/1917 | Bulley | 180/65 R X |
| 1,594,687 | 8/1926 | Pelton | 180/1 R |
| 1,681,944 | 8/1928 | Marshall, Jr. | 214/384 |
| 1,875,627 | 9/1932 | Mancha et al. | 105/50 X |
| 2,879,858 | 3/1959 | Thomas | 180/65 R X |
| 3,190,387 | 6/1965 | Dow | 180/65 R |
| 3,533,484 | 10/1970 | Wood, Jr. | 180/65 R |
| 3,708,028 | 1/1973 | Hafer | 180/68.5 R |
| 3,797,600 | 3/1974 | Miner | 180/65 R X |

FOREIGN PATENT DOCUMENTS

| 443,948 | 2/1968 | Switzerland | 180/34 |

Primary Examiner—Joseph F. Peters, Jr.
Assistant Examiner—Milton L. Smith
Attorney, Agent, or Firm—McNenny, Pearne, Gordon, Gail, Dickenson & Schiller

[57] ABSTRACT

In a light electrically powered vehicle, a battery pack of two to six batteries is supported on the rear axle independently of bending forces on the frame. The resultant (1) lighter frame requirement and (2) reduced battery requirement together have a synergistic weight-saving effect. The complete battery pack is light enough to be readily removable rearwardly by direct lifting on a manually operated handtruck and is readily replaced. The ready removability and replaceability of the pack frees the vehicle from battery charging shut-downs, and enables a fleet of vehicles such as golf carts to be kept fully in operation by provision of a battery recharging facility, extra battery packs and a few handtrucks. The vehicles of the fleet can be easily stored or shipped vertically for space-saving since the batteries can be readily removed. Further space-saving is effected by temporarily replacing the battery packs in the vertically stored vehicles, the packs being placed in their normal horizontal position.

8 Claims, 8 Drawing Figures

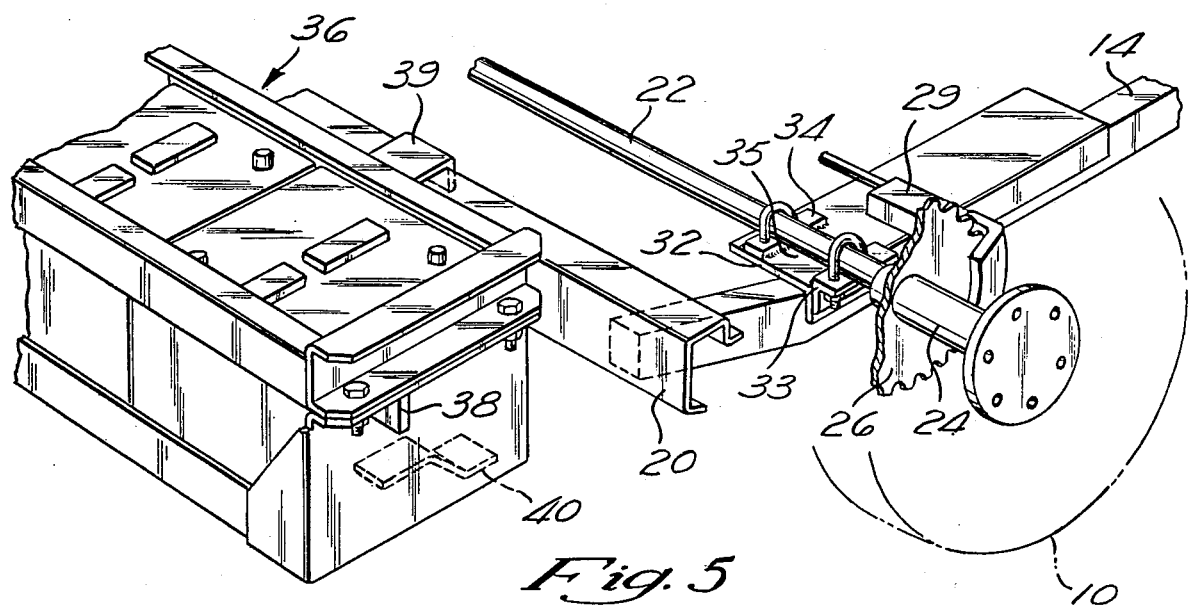
Fig. 5
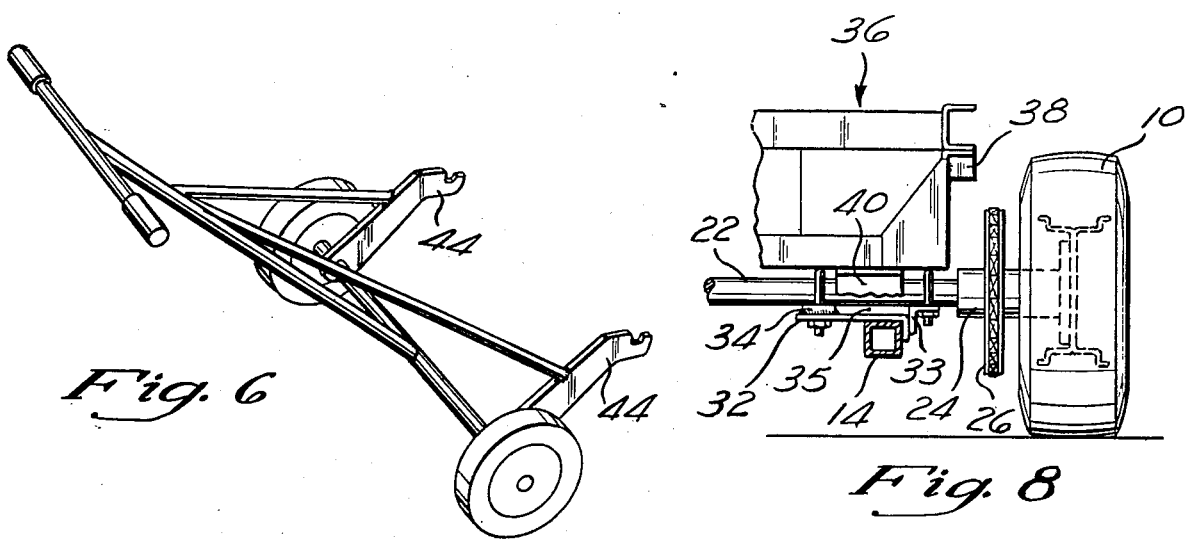
Fig. 6
Fig. 8
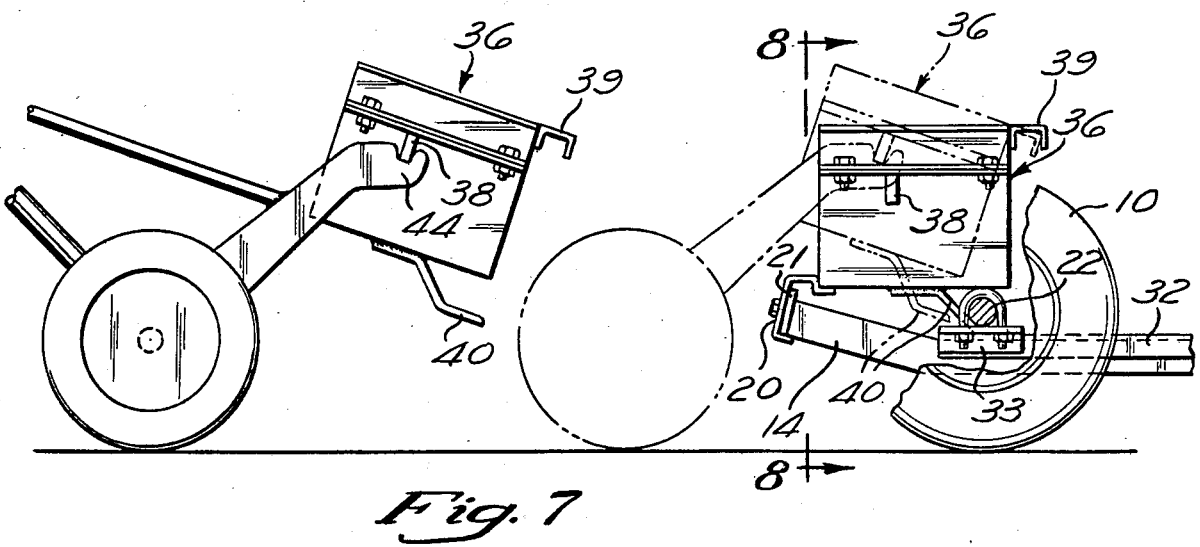
Fig. 7

VEHICLE AND BATTERY PACK

FIELD OF THE INVENTION

The invention relates to electrically driven vehicles such as golf carts, light service vehicles, and the like, which may be provided with removable battery packs.

DESCRIPTION OF THE PRIOR ART

Examples of prior art vehicles are found in several U.S. patents. In Mancha U.S. Pat. No. 1,875,627, a removable battery pack is placed at the rear of a railway locomotive.

In Thomas U.S. Pat. No. 2,879,858, a battery housing 40 is carried on a nonarticulated chassis.

In Dow U.S. Pat. No. 3,190,387, batteries are carried over the rear axle of the vehicle on the sprung frame.

In Hafer U.S. Pat. No. 3,708,028, a battery pack is removable from the side of a vehicle by a fork lift truck.

BACKGROUND OF THE INVENTION

When a fleet of electrically driven vehicles such as golf carts is to be kept in operation, the vehicles must either be taken out of service for recharging, thereby enlarging the total number of vehicles required in the fleet for a given level of service, or the vehicles must be provided with readily changeable battery packs so that only the batteries, and not the vehicles, need to be taken out of service for recharging.

Since the provision of readily replaceable battery packs thereby considerably reduces fleet requirements for a given level of service, there has long been a need for a practical system for providing replaceable battery packs. Generally the removal and replacement of batteries on a one-by-one basis is too slow and therefore impractical. On the other hand, battery packs consisting of a series of batteries have generally been too heavy and awkward to handle to accomplish ready replacement without the provision of heavy hoisting or lifting means such as power hoists or fork lift trucks which require provision of related service space and facilities and tend to create an "industrialized" ambiance which is unacceptable in a country club operation.

The present invention provides for the ready replacement of battery packs by a light dolly or handtruck so that battery packs can be quickly and easily replaced in a fleet of vehicles and a high level of service can be maintained for a given number of vehicles.

The replaceable battery packs that have been provided in the prior art have generally been mountable and demountable on the vehicle chassis or frame. Since in an electric vehicle, the weight of the batteries is a significant proportion of the total vehicle weight, the requirement for battery support significantly contributes to frame strength requirements.

In the present invention, battery packs are supported on the rear axle of the vehicle largely independently of bending forces on the frame. The resultant lighter frame requirement saves weight and reduces the battery requirement, also saving weight. The two savings have a synergistic weightsaving effect and together contribute to the practicality of the use of manually operated dollies or handtrucks for the quick change of the battery packs.

One of the important considerations in fleet operation is the amount of space required for vehicle and battery storage. It is desirable to avoid providing large areas of garage or shed space. Unless the batteries can be readily removed, it is impractical to save space by storing a fleet of vehicles in an upright position, and even when this is done the additional requirement of storing the batteries contributes greatly to space requirements.

The present invention makes it possible to quickly and easily store vehicles in an upright position, since the batteries can be readily removed. Furthermore, after the vehicles have been put in upright position, the batteries can be readily replaced and supported off the ground by the vehicles. Off-the-ground support is good practice for battery storage.

This procedure effects further space-saving by reducing the total space requirement to that required for upright storage of the vehicles alone, with the only excess requirement being that represented by additional battery packs beyond the number of vehicles in the fleet.

BRIEF DESCRIPTION OF THE DRAWINGS

FIG. 5 is an isometric view of the right rear portion of the vehicle illustrated in FIG. 1, and a portion of an associated battery pack which has been removed therefrom.

FIG. 6 is an isometric view of a dolly or handtruck used to load and unload battery packs.

FIG. 7 is a schematic illustration of the loading and unloading of the battery pack with the vehicle in the normal operative or horizontal position.

FIG. 8 is a view, partly broken away, taken on the plane of the line 8—8 in FIG. 7.

DESCRIPTION OF THE ILLUSTRATED EMBODIMENT

Figure 4:
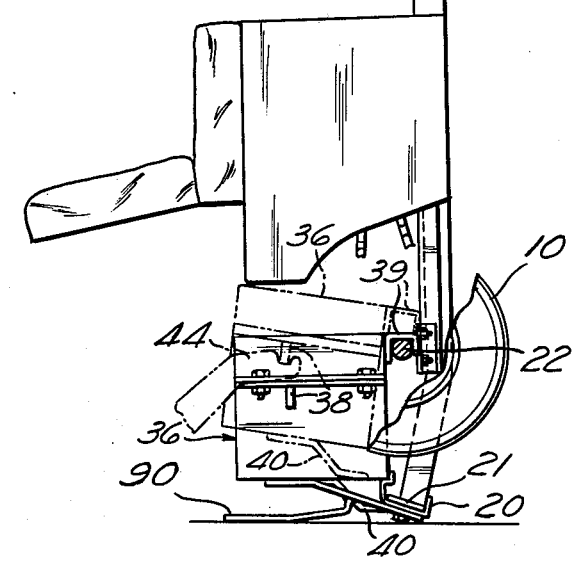
FIG. 4 is a side elevation of the vehicle in upright position and with the battery pack re-installed for temporary storage.

Although the invention may be employed with four-wheel vehicles, it is illustrated as embodied in a three-wheel rear-wheel drive vehicle. In the illustrated vehicle, a drive wheel 10 and the companion wheel at the other side of the vehicle support the rear of the vehicle and a steerable wheel 12 supports the front of the vehicle. The drive wheels and steerable wheel are mounted together on a non-articulated, unitary vehicle chassis which, in the illustrated example, includes a tubular side frame member 14 and a transverse rear frame member 20. A central longitudinal frame member parallel to 14, the other side frame member corresponding to the frame member 14, and a front transverse frame member (not shown) are also provided. The rear frame member 20 may also function as a rear bumper and as a battery pack retainer, as illustrated in FIGS. 1, 4, and 8, and discussed later in this description.

The vehicle is provided with a non-rotating, springing rear axle 22. Each drive wheel is mounted on its own end of the axle 22 by means of a rotatable mounting, such as the bearing sleeve 24 seen in FIGS. 5 and 8, to which a sprocket 26 is keyed. A chain drive 28 is associated with each drive wheel 10, and drives the associated sprocket on the drive wheel mounting. Each chain drive is powered by a suitable motor.

The non-rotating axle 22 is fixed to the tubular side frame members 14 in the manner best illustrated in FIG. 5. In the particular arrangement shown, a plate or angle 32 is welded to each side frame member 14. The non-rotating rear axle is fixed by U-bolts to each plate or angle 32 and to an associated small angle 33 welded thereto. Upon springing flexure of the axle, each side member is also springingly biased, but in torsion rather than in bending.

Figure 1:
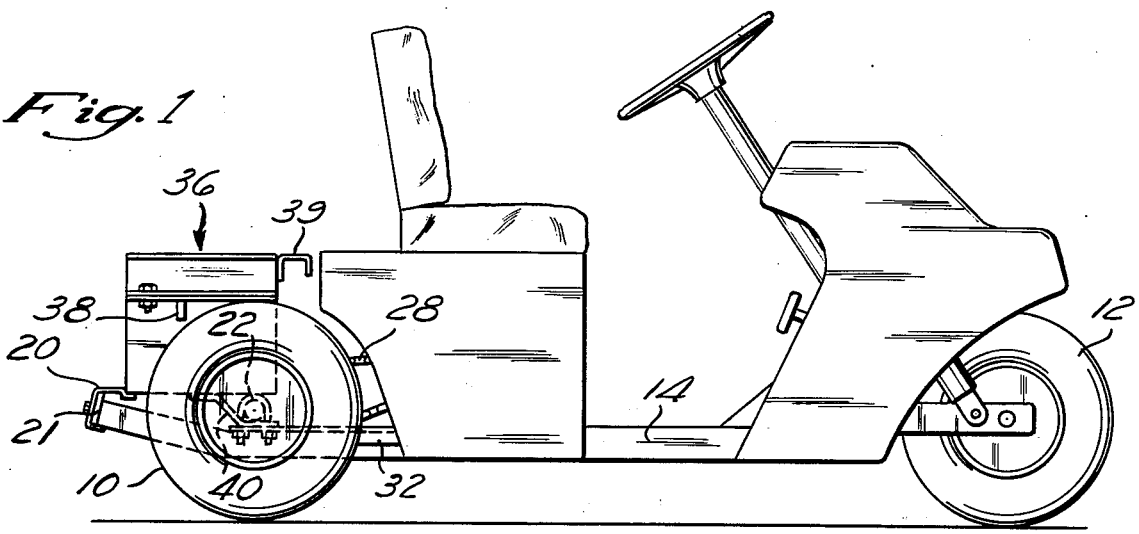
FIG. 1 is a schematic side elevation of a vehicle embodying the invention.

In the normal operating attitude of the vehicle, a battery pack 36 is supported without intervening springs directly over the axle 22, as best illustrated in FIGS. 1, 7 and 8. In the illustrated vehicle, the battery pack 36 comprises four automotive-type 6-volt batteries held in an open frame, the top portion of which is releasably secured to the bottom portion by bolts in a manner which will be apparent from the drawings. Each end of the battery pack is provided with a lifting flange or lug 38, and the underside of each end of the battery pack is provided with an axle-engaging finger 40. Somewhat inwardly spaced from each end of the battery pack, at its front upper edge, is an axle-engaging bracket 39.

In the particular arrangement illustrated, clearance for receiving the axle-engaging finger 40 is provided above the plate 32 by a spacer member 34 and by the difference in level between the top surface of the plate 32 and the small angle 33, as most clearly seen in FIGS. 5 and 8. An open space 35 is thereby defined immediately below the axle 22 which is of adequate dimensions to receive the axle-engaging finger 40.

A manually manipulatable dolly or handtruck, such as that shown in FIG. 6, is provided with a pair of lug supports 44 each adapted to engage one of the lifting flanges or lugs 38 to suspend the battery pack 36 from the dolly. The dolly is used to slip the battery pack into position on the vehicle, or remove it from the vehicle. When the vehicle is in its normal operating attitude, installation or removal of the battery pack is done in the manner illustrated in FIG. 7. The engagement between the lug supports 44 and the lugs 38 allows pivoting of the battery pack with respect to the dolly, so that as the forward side of the battery pack begins to rest on the rear axle and the axle-engaging fingers 40 begin to slip into the spaces 35, the rearward side of the battery pack is free to pivot downwardly from the phantom position to the solid-line position shown in the right-hand portion of FIG. 7. This motion is reversed upon removal of the battery pack. When the battery pack comes to rest in supported position on the vehicle, the illustrated recess in the top of the rear frame member 20 acts as a retainer, as seen in FIGS. 1 and 7. When the battery pack is removed by engaging the lug supports 44 with the lugs 38, the rear of the battery pack is initially raised sufficiently to clear the member 20 and allow rearward and upward movement of the battery pack to clear the fingers 40. The endmost terminals in the battery pack are connected, after installation of the pack, to power cables associated with the vehicle by conventional or quick-disconnect connectors (not shown), and are disconnected from the power cables before removal of the battery pack.

As seen in FIGS. 1 and 7, in the normal operating attitude of the vehicle with the battery pack installed, the axle 22 is inboard of the front side of the battery pack, whereas the rear frame member 20 is outboard of the rear side of the battery pack. Accordingly, a majority of the weight of the battery pack is transmitted directly downwardly to the axle 22. In practice, the parts may be proportioned so that the battery pack is even more centrally located over the axle 22, so that a great majority of the weight, or almost all of the weight, of the battery pack is transmitted directly downwardly to the axle.

As just indicated, however, even with the arrangement shown, the majority of the weight of the battery pack is transmitted directly downwardly to the axle 22. Thus, the majority of the weight of the battery pack is transmitted to the axle via frame-independent connections thereto. However, the principle would be substantially the same even if the weight of the front portion of the battery pack were transmitted to the axle through the frame but solely via compressive forces acting vertically through the frame. Thus, if the interconnection between the non-rotating axle 22 and the side frame members 14 were similar to that illustrated but with the axle 22 positioned under the side frame members 14, the weight of the front side of the battery pack would be directly borne by the side frame members 14 but would be transmitted to the axle 22 via compressive forces acting vertically through the frame members 14. Thus, the invention contemplates that at least a substantial portion of this weight is transmitted to the axle either via frame-independent connections thereto or via compressive forces acting vertically through frame members. In either case, the weight so carried does not impose significant bending loads on the frame 14. The weight so carried is directly sprung on the axle 22, which is a springing steel, and such springing is accomplished substantially independently of the frame 14.

This support of battery pack weight on the rear axle of the vehicle independently of bending forces on the frame reduces frame weight requirements, which in turn reduces power supply and battery weight requirements, the two weight savings having a reinforcing effect and contributing to the practicality of the overall lightness of construction and battery packs, making battery exchange by the use of hand-operated dollies or handtrucks feasible.

With the illustrated arrangement and the illustrated proportions between the parts seen in FIGS. 1 and 7, a considerable but minor proportion of the weight of the battery packs is carried by the side frame members 14. This weight does impose bending loads on the rearwardly cantilevered portions of the side frame members 14 that extend rearwardly of the axle 22, but such bending loads tend to counteract the bending loads imposed on the frame members forwardly of the axle 22 by the main weight of the vehicle, since the side frame members 14 extend rearwardly, and as a continuous beam, through the points of support of the main weight of the battery pack at the location of the axle 22. Such counteraction of the bending loads imposed by the main weight of the vehicle also tends to diminish the weight requirement for the frame.

The vehicle is provided with either permanently attached or temporarily attached stand means for supporting the vehicle upright on its rear end for storage. In the particular illustration, the side frame member 14 and the other central and side front-to-rear frame members are not welded directly to the transverse rear frame member 20, but are welded to short, transverse plates 21, which in turn are bolted to the rear frame member 20. Each short, transverse plate 21 is connected by a pair of bolts to the rear frame member 20 at each side of the welded interconnection between the short, transverse plate and its associated front-to-rear frame member.

Figure 2:
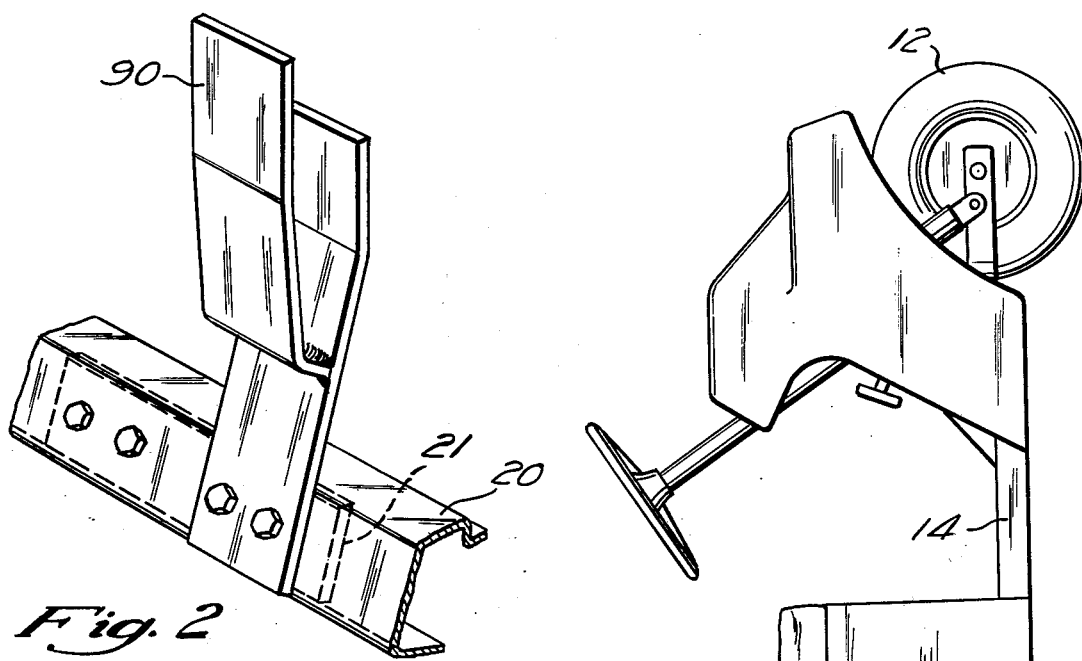
FIG. 2 is a perspective on a larger scale of stand means for supporting the vehicle in upright position.

A removable stand may be provided by using one of the pairs of bolts fastening the short, transverse plate 21 associated with the central frame member to temporarily mount the bracket 90, as illustrated in FIGS. 2 and 4. The battery pack is first removed in the manner shown in FIG. 7. The bracket 90 is then installed in the manner shown in FIG. 2. The vehicle is then upended to its storage attitude, as shown in FIG. 4. The dolly is then used in the manner illustrated in FIG. 4 (only one of the lug supports 44 is shown) to temporarily install the battery pack in the upended vehicle. The weight of the battery pack contributes to the stability of the vehicle in its upended position for storage or transport. The axle-engaging finger 40 of the hand dolly engages the lifting flange or lug 38 to lift the axle-engaging brackets 39 over and onto the rear axle 22, and as the battery pack is lowered, it comes to rest on the bracket 90 and, desirably, on the small inset in the upper portion of the rear frame member 20 in the manner illustrated in FIG. 4. The axle-engaging fingers 40 are laterally spaced from the bracket 90 and there is no interference between them. The battery is supported off the ground. The battery is removed by engaging the lifting flange or lug 38 with the lug supports 44 of the dolly and lifting the pack upwardly and to one side.

Figure 3:
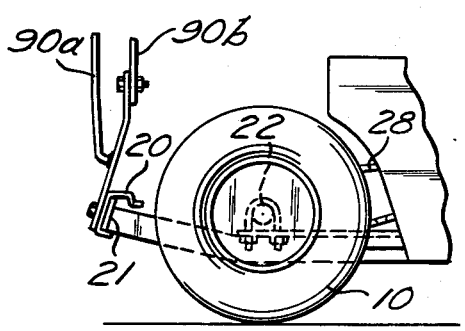
FIG. 3 is a view similar to the left end of FIG. 1, but with the battery pack removed and the stand means installed.

A permanent stand arrangement is illustrated in FIG. 3. The rear frame member 20 is extended outboard of the battery pack on each side of the vehicle. Brackets 90a (only one of which is seen in FIG. 3) are bolted or welded thereto at these outboard locations so that the battery pack in the normal position of the vehicle can be installed and removed without interference with the brackets. The brackets are provided with swing plates, such as the plate 90b seen in FIG. 3, which can be swung from and to a position in which they will support the battery pack when it is installed in the upright attitude of the vehicle, but interfere with its removal or installation in the normal operating attitude of the vehicle. The illustrated thumbscrew or any suitable detent arrangement may be employed to hold the swing plates in their two positions of adjustment. The swing plates are swung to their interfering positions before replacing the pack after upending the vehicle, and are therefore in position to support the bottom of the pack for temporary storage.

When a sizable fleet of vehicles is to be stored, they may be upended and their associated battery packs installed in them in the manner shown in FIG. 4. Total space requirements for vehicles and batteries are thereby considerably reduced as compared to prior practice.

The scope of the invention is not necessarily limited to the specific details of the illustrated embodiment, but is defined by the following claims.

What is claimed is:

1. In an electrically driven vehicle, a unitary non-articulated chassis frame carrying a pair of drive wheels in the rear and steerable wheel means in the front, a rear axle, each drive wheel being mounted at its own end of the axle and being independently driven by its own motor and power linkage with no mechanical differential or other protuberance projecting upwardly from the center of the axle, a battery pack capable of ready removal and replacement and supported, in said absence of projection of any protuberance, immediately over the axle and removable rearwardly thereof, the battery pack being supported between the drive wheels and between the output ends of said power linkages, the weight of the battery pack being transmitted directly downwardly to the axle and thence to each wheel.

2. In an electrically driven vehicle, a unitary non-articulated chassis frame carrying a pair of drive wheels in the rear and steerable wheel means in the front, a rear axle, each drive wheel being mounted at its own end of the axle and being independently driven by its own motor and power linkage with no mechanical differential or other protuberance projecting upwardly from the center of the axle, a battery pack capable of ready removal and replacement and supported, in said absence of projection of any protuberance, immediately over the axle, the pack being readily removable rearwardly by direct lifting on a manually operated handtruck, the battery pack being supported between the drive wheels and between the output ends of said power linkages, the weight of the battery pack being transmitted directly downwardly to the axle and thence to each wheel.

3. In an electrically driven vehicle, a unitary non-articulated chassis frame carrying a pair of drive wheels in the rear and steerable wheel means in the front, a rear axle, each drive wheel being mounted at its own end of the axle and being independently driven by its own motor and power linkage with no mechanical differential or other protuberance projecting upwardly from the center of the axle, a battery pack capable of ready removal and replacement and supported, in said absence of projection of any protuberance, immediately over the axle and removable rearwardly thereof, the battery pack being supported between the drive wheels and between the output ends of said power linkages, the weight of the battery pack being transmitted directly downwardly to the axle and thence to each wheel, the vehicle frame including tubular side frame beams which are directly supported by the axle without intervening spring means.

4. In an electrically driven vehicle, a unitary non-articulated chassis frame carrying a pair of drive wheels in the rear and steerable wheel means in the front, a rear axle, each drive wheel being mounted at its own end of the axle and being independently driven by its own motor and power linkage with no mechanical differential or other protuberance projecting upwardly from the center of the axle, a battery pack capable of ready removal and replacement and supported, in said absence of projection of any protuberance, immediately over the axle and removable rearwardly thereof, the battery pack being supported between the drive wheels and between the output ends of said power linkages, the weight of the battery pack being transmitted directly downwardly to the axle and thence to each wheel, the vehicle frame including tubular side frame beams which are directly supported by the axis without intervening spring means and which extend from the forward portion of the vehicle rearwardly, and as a continuous beam, through the points of support of the main weight of the battery pack.

5. In an electrically driven vehicle, a unitary non-articulated chassis frame carrying a pair of drive wheels in the rear and steerable wheel means in the front, a rear axle, each drive wheel being mounted at its own end of the axle and being independently driven by its own motor and power linkage with no mechanical differential or other protuberance projecting upwardly from the center of the axle, a battery pack capable of ready removal and replacement and supported, in said absence of projection of any protuberance, immediately over the axle and removable rearwardly thereof, the battery being supported between the drive wheels and between the output ends of said power linkages, the majority of the weight of the battery pack being transmitted directly downwardly to the axle and thence to each wheel, the vehicle frame including tubular side frame beams which are directly supported by the axle without intervening spring means and which extend from the forward portion of the vehicle rearwardly, and as a continuous beam, through the points of support of the main weight of the battery pack, and continuously rearwardly therefrom to provide cantilevered support of less than a major portion of the weight of the battery pack.

6. In a battery-powered vehicle having a frame and front and rear wheels, battery-pack-receiving means at the rear of the vehicle for receiving battery packs and for ready removal and replacement thereof, stand means for supporting the vehicle upright on its rear end for storage, said battery-pack-receiving means being capable of receiving a horizontally positioned battery pack both in the normal horizontal operating attitude of the vehicle and, with said stand means installed, in the back-end-down upright attitude of the vehicle.

7. In a battery-powered vehicle having a frame and front and rear wheels, battery-pack-receiving means at the rear of the vehicle for receiving battery packs and for ready removal and replacement thereof, stand means for supporting the vehicle upright on its rear end for storage, said battery-pack-receiving means being capable of receiving a horizontally positioned battery pack both in the normal horizontal operating attitude of the vehicle and, with said stand means installed, in the back-end-down upright attitude of the vehicle, said battery-pack-receiving means supporting received battery packs off the ground in both the horizontal and vertical attitudes of the vehicle.

8. In an electrically driven vehicle, a unitary non-articulated chassis frame carrying a pair of drive wheels in the rear and steerable wheel means in the front, a rear axle, each drive wheel being mounted at its own end of the axle and being independently driven by its own motor and power linkage with no mechanical differential or other protuberance projecting upwardly from the center of the axle, a battery pack capable of ready removal and replacement and supported over the axle and removable rearwardly thereof, the battery pack being supported, in said absence of projection of any protuberance, immediately over the axle, the battery pack being supported between the drive wheels and between the output ends of said power linkages, the majority of the springing of the weight of the battery pack being done by axle deflection, the vehicle frame including tubular side frame beams which are directly supported by the axle without intervening spring means.

* * * * *